United States Patent
Tinsley et al.

(10) Patent No.: US 7,415,245 B2
(45) Date of Patent: Aug. 19, 2008

(54) PULSE SHAPING SIGNALS FOR ULTRAWIDEBAND COMMUNICATION

(75) Inventors: Keith R Tinsley, Beaverton, OR (US); Jeffery R Foerster, Portland, OR (US); Minnie Ho, Los Altos, CA (US); Evan R Green, Beaverton, OR (US); Luiz M. Franca-Neto, Portland, OR (US); Siva G. Narendra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 518 days.

(21) Appl. No.: 10/815,171

(22) Filed: Mar. 31, 2004

(65) Prior Publication Data

US 2005/0221760 A1  Oct. 6, 2005

(51) Int. Cl.
*H04B 15/00* (2006.01)
(52) U.S. Cl. .................... 455/62; 375/130; 330/300; 365/177; 708/702; 335/4
(58) Field of Classification Search ............ 455/62; 375/297, 130
See application file for complete search history.

(56) References Cited

U.S. PATENT DOCUMENTS

| | | | |
|---|---|---|---|
| 4,181,889 A | | 1/1980 | Davis et al. |
| 4,577,335 A | | 3/1986 | Wong et al. |
| 4,815,135 A | * | 3/1989 | Taguchi ............ 704/217 |
| 5,612,971 A | * | 3/1997 | Dormer ............ 375/133 |
| 5,677,927 A | | 10/1997 | Fullerton et al. |
| 5,818,099 A | * | 10/1998 | Burghartz ............ 257/548 |
| 5,945,940 A | | 8/1999 | Cuomo |
| 6,240,129 B1 | * | 5/2001 | Reusens et al. ......... 375/222 |
| 6,384,773 B1 | | 5/2002 | Martin et al. |
| 6,476,957 B1 | * | 11/2002 | Ward et al. ............ 359/326 |
| 6,490,328 B1 | | 12/2002 | Wu |
| 6,529,166 B2 | | 3/2003 | Kanamaluru |
| 6,570,444 B2 | | 5/2003 | Wright |
| 6,577,691 B2 | | 6/2003 | Richards et al. |
| 6,606,350 B2 | | 8/2003 | Dress, Jr. et al. |

(Continued)

FOREIGN PATENT DOCUMENTS

WO    WO-01/39451 A1    5/2001

(Continued)

OTHER PUBLICATIONS

"PulsON™ Technology—Time Modulated Ultra-Wideband for Wireless Application", http://www.timedomain.com/Files/downloads/techpapers/PulsONoverview.pdf, (2000), 13 pgs.

(Continued)

*Primary Examiner*—David C. Payne
*Assistant Examiner*—Adolf Dsouza
(74) *Attorney, Agent, or Firm*—Schwegman, Lundberg & Woessner, P.A.

(57) ABSTRACT

An ultrawideband radio frequency pulse is generated by shaping a carrier signal having a selected frequency with a window function. The shaped carrier is gated to produce the ultrawideband pulse. In further embodiments, the window function comprises a sinusoidal function, and the ultrawideband pulse is formed via a mixer and a CMOS radio frequency switch.

2 Claims, 9 Drawing Sheets

U.S. PATENT DOCUMENTS

| | | |
|---|---|---|
| 6,922,451 B1 | 7/2005 | Ichihara |
| 6,937,667 B1 | 8/2005 | Fullerton et al. |
| 6,950,485 B2 | 9/2005 | Richards et al. |
| 6,952,456 B1 | 10/2005 | Aiello et al. |
| 6,959,032 B1 | 10/2005 | Richards et al. |
| 2001/0033576 A1 | 10/2001 | Richards |
| 2002/0071509 A1 | 6/2002 | Richards et al. |
| 2002/0097790 A1 | 7/2002 | Dress, Jr. et al. |
| 2003/0052727 A1 | 3/2003 | Komurasaki et al. |
| 2003/0053555 A1 | 3/2003 | McCorkle et al. |
| 2003/0087624 A1* | 5/2003 | Leenaerts .................... 455/323 |
| 2003/0128783 A1* | 7/2003 | Richards et al. ............. 375/355 |
| 2003/0161411 A1 | 8/2003 | McCorkle et al. |
| 2003/0174048 A1* | 9/2003 | McCorkle ................ 340/10.34 |
| 2003/0232612 A1* | 12/2003 | Richards et al. ............. 455/323 |
| 2004/0005914 A1 | 1/2004 | Dear |
| 2004/0017840 A1 | 1/2004 | Siwiak |
| 2004/0032354 A1 | 2/2004 | Knobel et al. |
| 2004/0047285 A1 | 3/2004 | Foerster et al. |
| 2004/0048574 A1 | 3/2004 | Walker et al. |
| 2004/0071118 A1 | 4/2004 | Dabiak et al. |
| 2004/0077306 A1 | 4/2004 | Shor et al. |
| 2004/0125859 A1 | 7/2004 | Green et al. |
| 2004/0131130 A1 | 7/2004 | Shor et al. |
| 2004/0174928 A1* | 9/2004 | Siwiak et al. ................ 375/146 |
| 2004/0186867 A1* | 9/2004 | Schenk ........................ 708/300 |
| 2004/0213351 A1* | 10/2004 | Shattil ......................... 375/260 |
| 2004/0239337 A1* | 12/2004 | Jean et al. ................... 324/638 |
| 2005/0070242 A1* | 3/2005 | Davis .......................... 455/293 |
| 2005/0078767 A1* | 4/2005 | Liu .............................. 375/297 |
| 2006/0140249 A1* | 6/2006 | Kohno ......................... 375/130 |

FOREIGN PATENT DOCUMENTS

| | | |
|---|---|---|
| WO | WO-01/93520 A2 | 12/2001 |
| WO | WO-01/99305 A2 | 12/2001 |
| WO | WO-2004/025853 A2 | 3/2004 |
| WO | WO-2004/062128 A2 | 7/2004 |
| WO | WO-2005/099115 A1 | 10/2005 |

OTHER PUBLICATIONS

Taylor, J. D., *Introduction to Ultra-Wideband Radar Systems*, CRC Press, Inc., Boca Raton, FL, (1995), 118-119, 140-143.

Yang, L.-L., et al., "Residue Number System Assisted Fast Frequency-Hopped Synchronous Ultra-Wideband Spread-Spectrum Multiple-Access: A Design Alternative to Impulse Radio", *IEEE Journal on Selected Areas in Communications*, 20(9), (2002), 1652-1663.

"International Search Report for corresponding PCT Application No. PCT/US2005/010179", (Jul. 12, 2005),4 pgs.

Chudobiak, M. J., et al., "Subnanosecond 300 V Diffused Step Recovery Diode", http://www.avtechpulse.com/papers/subnano/ ,(2004),6 pages.

Kruger, A., "Tunnel Diodes", ChipCenter Questlink—Passive/Active Components (http://archive.chipcenter.com/eexpert/akruger/ akruger059.html), (2003), 3 pgs.

WU, Z.., et al., "High Performance Ultra-Wide Bandwidth Systems via Novel Pulse Shaping and Frequency Domain Processing", *IEEE Conference on Ultra Wideband Systems and Technologies, 2002*, (May 21, 2002),53-58.

Zimmer, R., et al., "A Simple Method of Generating UWB Pulses", *Eight IEEE International Symposium on Spread Spectrum Techniques and Applications—Programme and Book of Abstracts*, IEEE Piscataway, NJ, USA,(Aug. 30, 2004), 112-114.

\* cited by examiner

BLACKMAN
$$p(t) = \begin{cases} 0.42 - 0.5\cos(2\pi t/M) + 0.08\cos(4\pi t/M), & 0 < t < M, \\ 0, & \text{otherwise} \end{cases}$$

HANNING
$$p(t) = \begin{cases} 0.5 - 0.5\cos(2\pi t/M), & 0 < t < M, \\ 0, & \text{otherwise} \end{cases}$$

HAMMING
$$p(t) = \begin{cases} 0.54 - 0.46\cos(2\pi t/M), & 0 < t < M, \\ 0, & \text{otherwise} \end{cases}$$

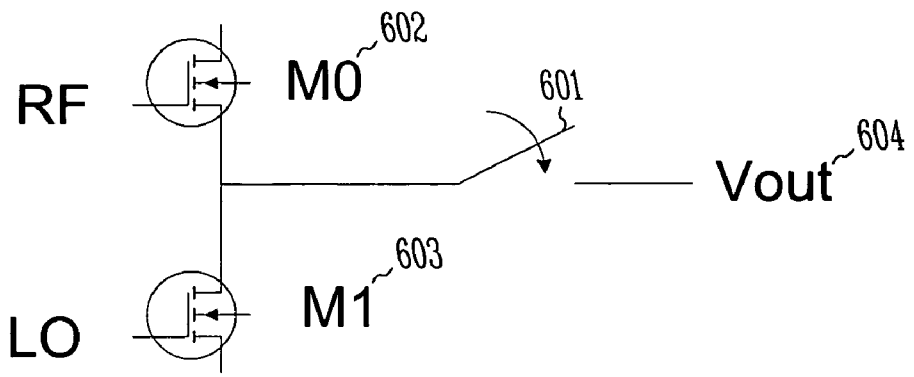
x(t)     *Fig. 6*
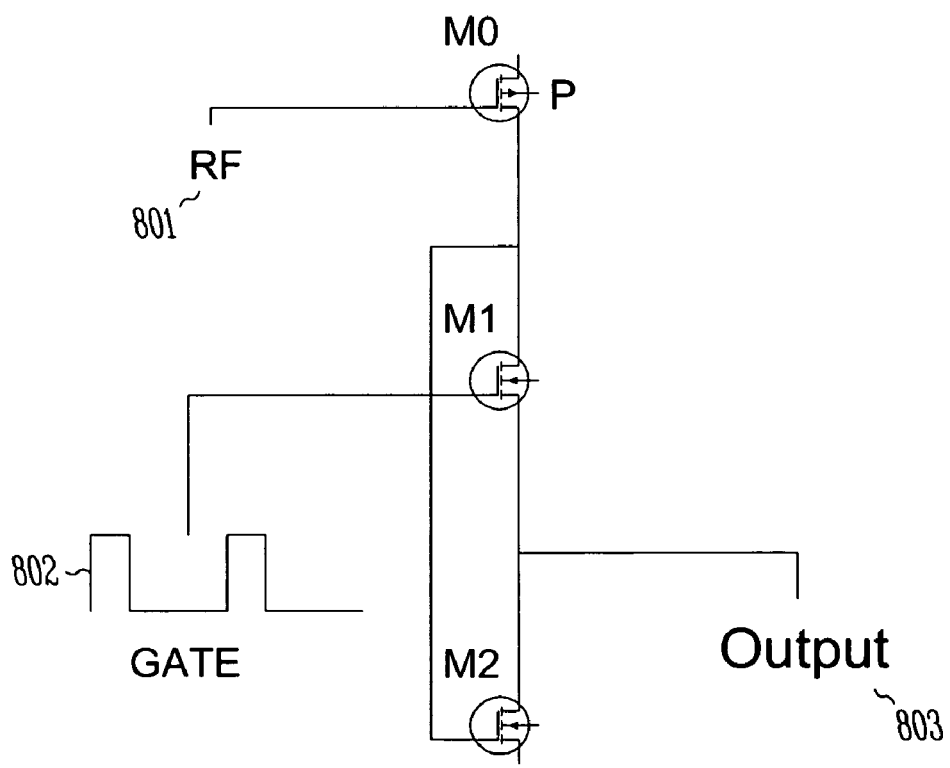
*Fig. 8*

US 7,415,245 B2

PULSE SHAPING SIGNALS FOR ULTRAWIDEBAND COMMUNICATION

TECHNICAL FIELD

Various embodiments of the invention relate generally to ultrawideband communications, and more specifically to pulse shaping finite duration signals for use in an ultrawideband communication system.

BACKGROUND

Electric signals used for wireless communication typically include a carrier signal that exists independent of the data being conveyed, and a modulation signal that is applied to the carrier signal to embed the conveyed data into the carrier. The modulated carrier signal is then conveyed as radio frequency electromagnetic waves to a receiver, which extracts the modulation signal data from the carrier frequency and so recovers the data.

Carrier signals are typically designed to have one or more narrow, carefully controlled frequencies, ensuring that radiated power is controlled to be within specified guidelines and is used to the greatest benefit of the transmitting device. But, some systems have adapted wireless communications methods having a seemingly inconsistent approach, which is to spread the signal frequency out over a very wide range, resulting in a low fraction of total transmitted power at any one specific frequency. Such signals are often called ultrawideband signals, and are being explored for short-range communications systems, such as wireless networks, as well as for some special functions like radar in which the bandwidth makes such a signal difficult to jam. But, generation of an ultrawideband signal is not a trivial task, and requires methods and circuits different from those traditionally used to produce narrow carrier signals.

A system for producing ultrawideband signals is therefore desired.

BRIEF DESCRIPTION OF THE FIGURES

FIG. 6 shows a variable transconductance circuit and CMOS RF switch, consistent with an embodiment of the present invention.

FIG. 8 is a circuit diagram, illustrating construction of an RF switch as is used to gate the window-shaped carrier functions consistent with an embodiment of the present invention.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides in various embodiments a system for generating ultrawideband radio frequency pulses. A carrier signal having a selected frequency is generated, and is shaped with a window function to produce the ultrawideband pulse. The produced pulse is in some embodiments gated by a RF switch, which provides a switched mix of the carrier signal and a sinusoidal shaping signal as its output. The shaping signal or window function used is in various embodiments a sinusoidal function, such as a Hamming, Hanning, or Blackman window, as are traditionally used when working with discrete time-sampled digital data in spectral analysis or to produce finite impulse response filters.

Figure 1:
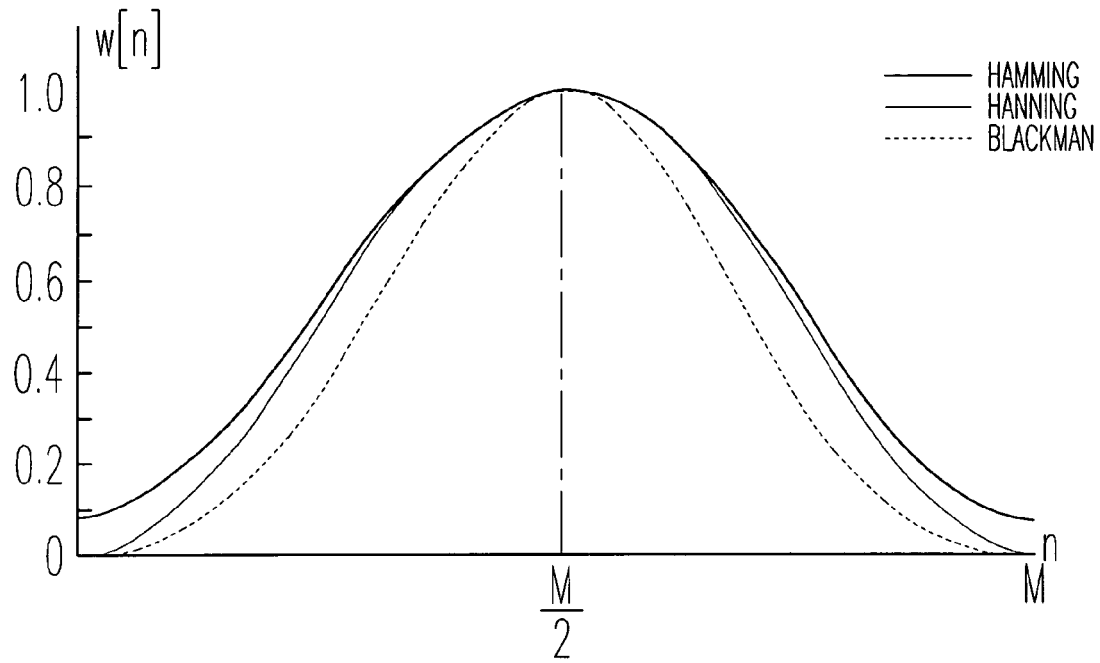
FIG. 1 illustrates a variety of sinusoidal window functions, consistent with various embodiments of the present invention.

FIG. 1 illustrates a variety of sinusoidal window functions, consistent with various embodiments of the present invention. The various functions presented here are representative of functions that are applied to a carrier signal in various embodiments of the invention to produce a ultrawideband radio frequency (RF) product signal. Each of the three functions presented are derived from a sinusoidal function, and have a zero value outside their respective periods "M". Although the functions are traditionally used for digital filtering methods, they are implemented as continuous analog functions for purposes of the example embodiments of the present invention described here and so are shown here as continuous functions rather than as a series of discrete points. The window functions p(t) shown here are applied periodically to a carrier signal s(t) function, resulting in a modulated signal such as is shown generally in FIG. 2a.

Carriers and modulation methods vary from application to application, and include such well-known methods as analog amplitude modulation of the carrier as is used in AM radio, and analog frequency modulation of the carrier as is used in FM radio. Similar modulation methods exist for digital signals, including amplitude shift keying in which the amplitude is modulated between discrete values, and frequency shift keying in which the frequency is modulated between discrete values. Additional methods, such as phase shift keying in which the phase of the carrier is inverted to represent a digital symbol, are also useful in digital systems. More sophisticated systems employ multiple methods, such as the commonly used quadrature amplitude modulation method which uses four distinct phases and two distinct amplitudes to encode data.

The carrier itself is another matter of concern, and is typically dictated by the application and by Federal Communication Commission (FCC) regulations. The radio spectrum is carefully regulated to ensure that only certain approved products transmit radio frequency signals at certain frequencies, typically at power levels that are carefully restricted to minimize interference with other products. The designer of an RF communications system is therefore restricted in carrier frequency and power choice by regulations, and must ensure the product does not transmit excessive power at restricted or unintended frequencies as well as at the carrier frequency.

The carrier signal is therefore typically designed to have one or more narrow, carefully controlled frequencies, ensuring that radiated power is controlled to be within the specified guidelines and is used to the greatest benefit of the transmitting device. But, some systems have adapted wireless communications methods having a seemingly inconsistent approach, which is to spread the signal frequency out over a very wide range, resulting in a low fraction of transmitted power at any one specific frequency. Such signals are often called ultrawideband signals, and are characterized by having a bandwidth that is greater than 20% of the center frequency, or alternately that have a bandwidth of 500 MHz or greater.

These signals remain compliant with FCC regulations by emitting only a small amount of power at any given frequency, and rely upon a receiver receiving the full ultra-wide bandwidth signal to provide an adequately strong signal to overcome RF noise and other problems. Such systems are therefore being explored for short-range communications systems, such as wireless networks, as well as for some special functions like radar in which the bandwidth makes such a signal difficult to jam. But, generation of an ultrawideband signal is not a trivial task, and requires methods and circuits different from those traditionally used to produce narrow carrier signals. The example embodiments of the invention presented here illustrate various methods of generating such ultrawideband signals.

Figure 2A:
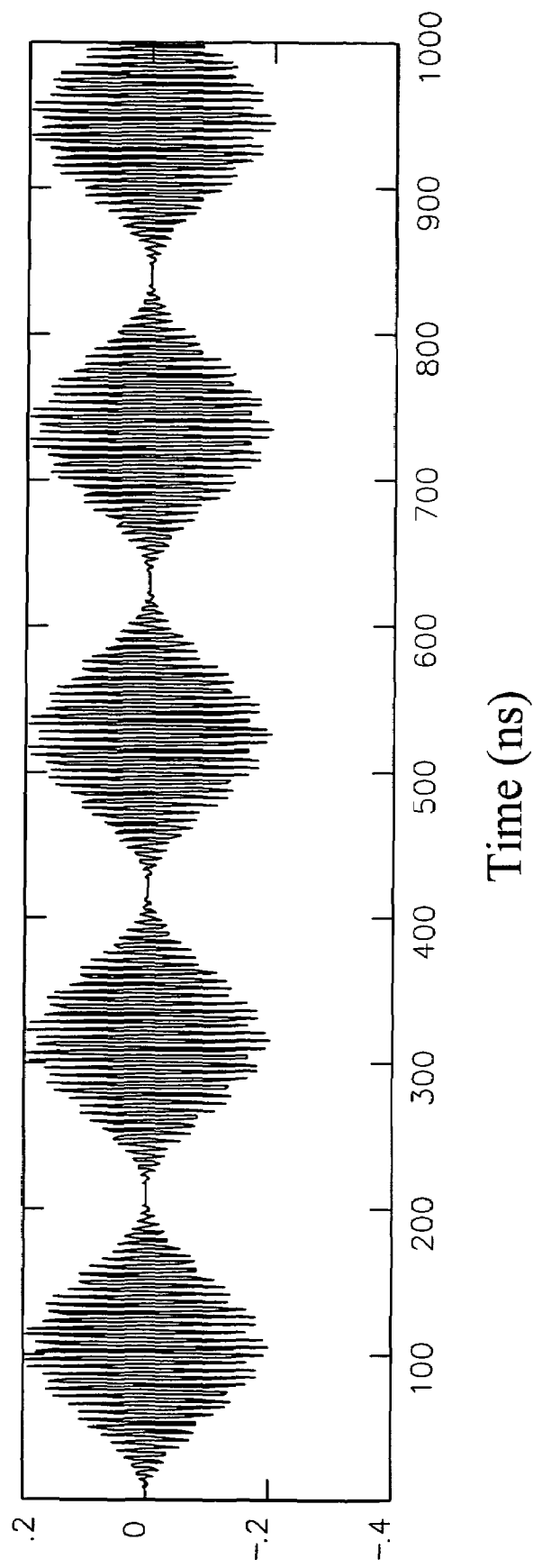
FIG. 2A shows the modulation product of a window function p(t) applied to a sinusoidal carrier signal s(t).
Figure 2B:
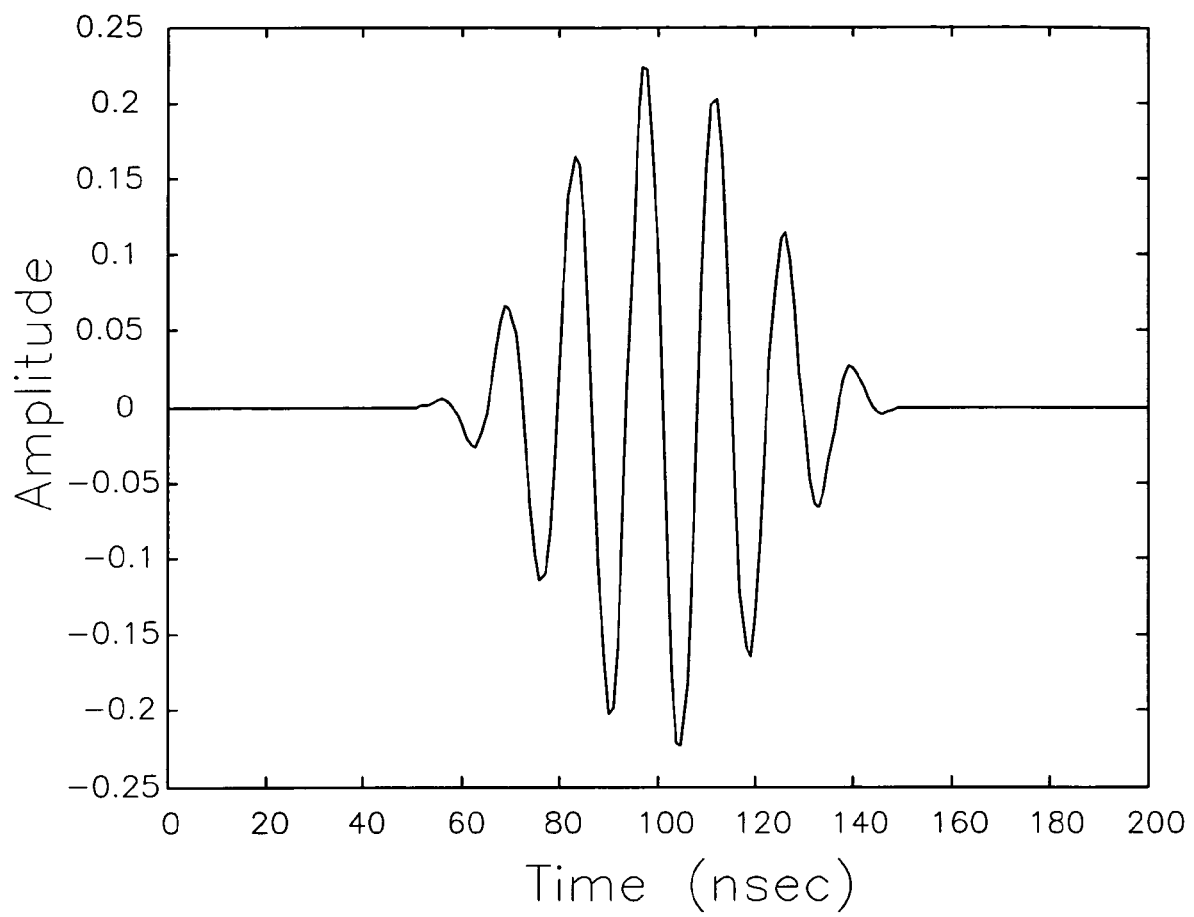
FIG. 2B shows a magnified portion of FIG. 2, consistent with an embodiment of the present invention.
Figure 3:
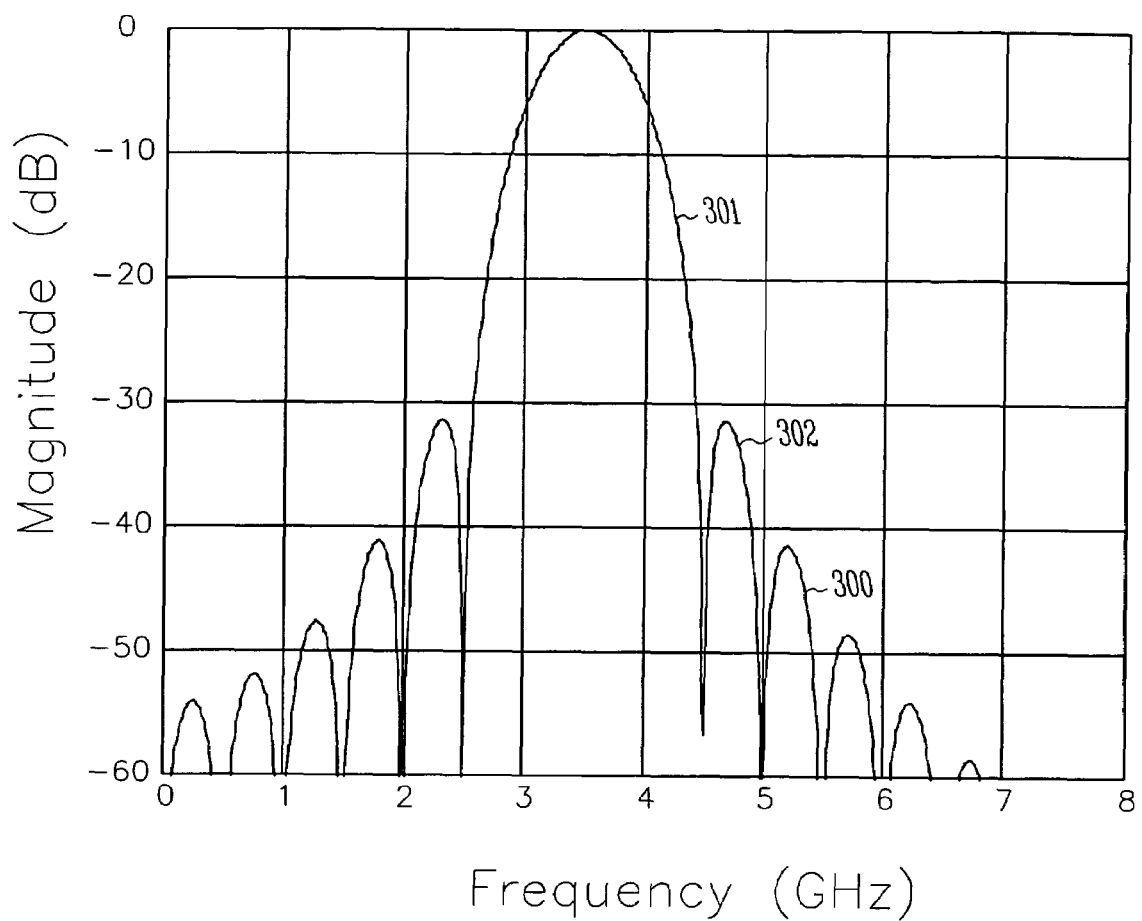
FIG. 3 shows the spectrum of the product of the window function p(t) and the sinusoidal carrier signal s(t), consistent with an embodiment of the present invention.

FIG. 2b illustrates a magnified view of a portion of FIG. 2a, showing the result of combining the window signal p(t) with the carrier signal s(t) to produce modulation product p(t)*s(t). The window function p(t) shown here is applied periodically to a carrier signal s(t) over the duration, Tm, of deterministic phase, resulting in a modulated signal such as is shown in FIGS. 2a and 2b. The combined product's spectrum is dependent on the carrier frequency and on the window function applied, as is illustrated in FIG. 3. The center frequency of 3.5 GHz is the frequency of the carrier signal s(t), while the spectrum width of the primary lobe 301 is dependent on the period of the window function p(t). Further, the amplitude of secondary lobes 302 and 303 is determined largely by the window function p(t) that is selected.

The peak secondary node amplitude can be estimated by knowing the type of window function p(t) that is employed—a simple rectangular window would be expected to produce peak side lobe amplitudes only 13 dB down from the main lobe peak amplitude, for example. Because it is desirable in some embodiments of the present invention to limit amplitude of side lobes to increase the proportion of energy radiated within the intended main lobe 301, the functions of FIG. 1 are employed in various embodiments. It is expected that a Hanning window's side lobe peak amplitude will be approximately 31 deciBels down in amplitude from the main lobe peak amplitude, while Hamming window side lobes will peak at approximately 41 dB down and Blackman window side lobes will peak approximately 57 dB down.

The width of the main lobe varies with various functions, too, and must be taken into account when selecting a window function for application to a carrier. For example, a rectangular window produces a main lobe of width 4 pi/(m+1), where m is the period of the window. Similarly, Hanning and Hamming functions produce a main spectral lobe of width 8 pi/m, while a Blackman window produces a somewhat larger main lobe of 12 pi/m. Although the Blackman window again appears to be a good choice for ultrawideband signal production given the main lobe width, these are but a few examples of the broad range of window functions that are employed in different embodiments of the invention.

The product of the window function p(t) and the carrier signal s(t) is in some embodiments of the invention further gated by a gating function G(t), such as by an RF switch. The gating function RF switch controls the time duration and spectral occupancy of the product signal, resulting in an output signal of G(t)*p(t)*s(t). The gating function is further specified in some embodiments of the invention to ensure that produced ultrawideband pulses meet applicable standards or spectral profile mask compliance.

Figure 4:
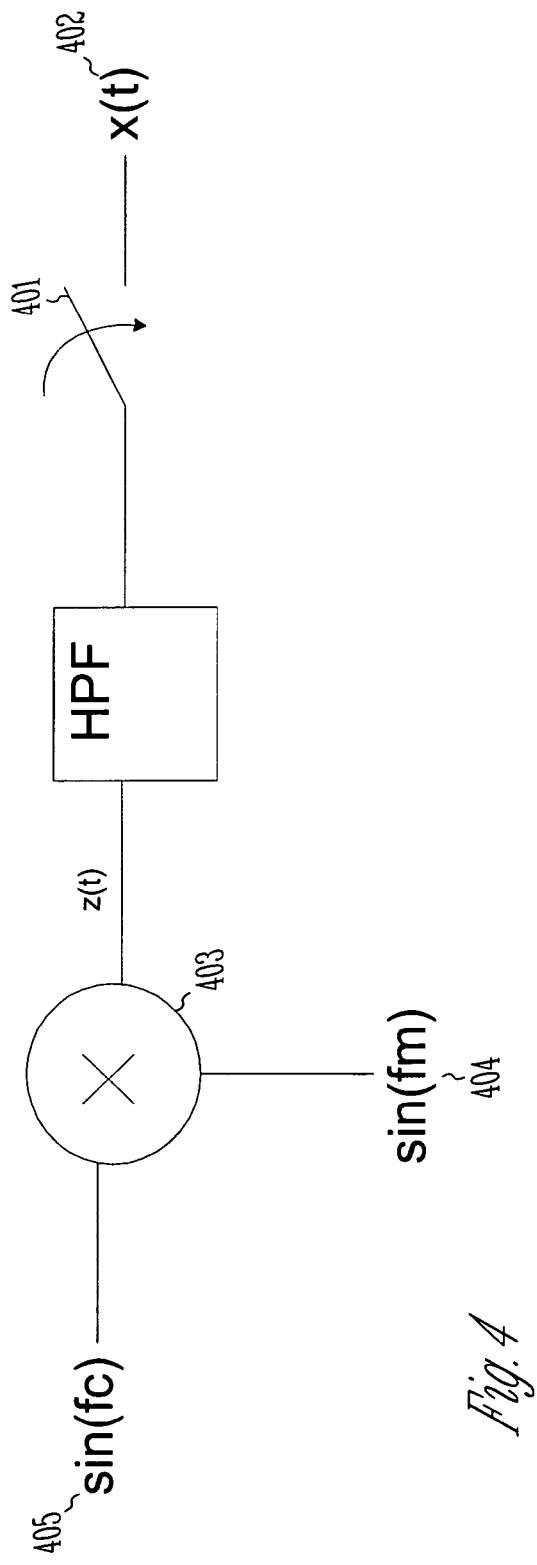
FIG. 4 shows a single balance mixer and a CMOS RF switch, consistent with one embodiment of the present invention.

FIGS. 4-9 illustrate various circuit topologies for implementing RF switch gating of an RF product signal p(t)*s(t), consistent with various embodiments of the present invention. FIG. 4 shows a single balance mixer with an RF switch 401, used to gate the output signal x(t) shown at 402. The inputs to mixer 403 include carrier signal 404, a sinusoidal signal with frequency f(m), and Hanning window function 405, implemented as a sinusoidal signal having frequency f(c). Although the window function 405 is a sine function and not the time-limited cosine function used to define the Hanning window in FIG. 1, the RF switch gates the output to limit x(t) such that the output signal is only present over the Hanning window period M of the sinusoidal function applied to the mixer at 405. Reexamination of the window definitions for the window functions presented in FIG. 1 reveal that Hanning windows can be implemented using a circuit such as that of FIGS. 4-9, with a single sinusoidal source and minimal further processing such as offset or scaling. The RF switch is used in various other embodiments of the invention to gate a product of sinusoidal signals to implement windowed carrier signals with other sinusoidal functions, such as the Hamming and Blackman windows of FIG. 1, but a second sinusoidal source is employed for the Blackman window and further calibration of voltage offset and scaling is performed to produce the defined window functions.

Figure 5:
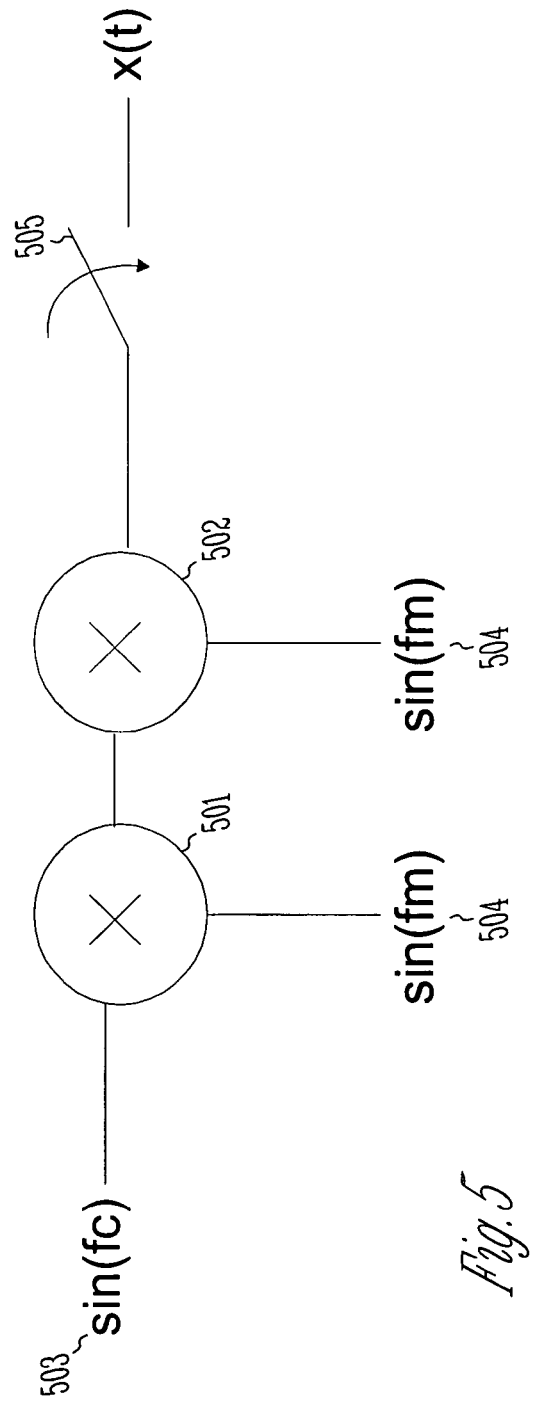
FIG. 5 shows cascaded double balanced mixers and a CMOS RF switch, consistent with an embodiment of the present invention.

FIG. 5 shows an embodiment having cascaded dual mixers 501 and 502, with each mixer mixing the window function sinusoid 503 with carrier signal 504. The inputs to mixer 501 include carrier signal 501 and a product of the window function sinusoid 503 and carrier sinusoid 504. The differential response of MOSFET mixers 501 and 502 result in elimination of common mode input components, so that the output is $sin^2(fm)*sin(fc)$ rather than the more complex $sin(fc)+sin(fm)+sin(fc)*sin(fm)$ product of FIG. 4's mixer 403. The resulting product is again gated via RF switch 505 to produce the output signal x(t).

FIG. 6 shows another example of an ultrawideband generation circuit using an RF gating switch 601. Transistor M0 is biased to operate in the constant current region, and transistor M1 is biased to operate in the triode region. The transconductance of M1 can be varied as a function of input carrier signal RF and shaping signal LO, which are further provided to a second complementary circuit such that RF is 180 degrees out of phase but LO remains the same. The output Vout at 604 and the corresponding Vout from the second complementary circuit form a differential output, which is a shaped function of input carrier signal RF. If input signal RF is sin(fin) and input shaping signal LO is sin (fc), the differential output is $sin^2(fin)*sin(fc)$, as in the cascaded double balance mixer circuit of FIG. 5. In such an embodiment, the RF signal coupled to the gate of M0 at 602 corresponds to the sin(fm) signal shown at 504 of FIG. 5, and the input shaping signal LO coupled to the gate of M1 at 603 corresponds to the window function sinusoid illustrated at 503. The circuit of FIG. 6 and its complementary circuit form the cascaded double balance mixer shown as 501 and 512 of FIG. 5.

Figure 7:
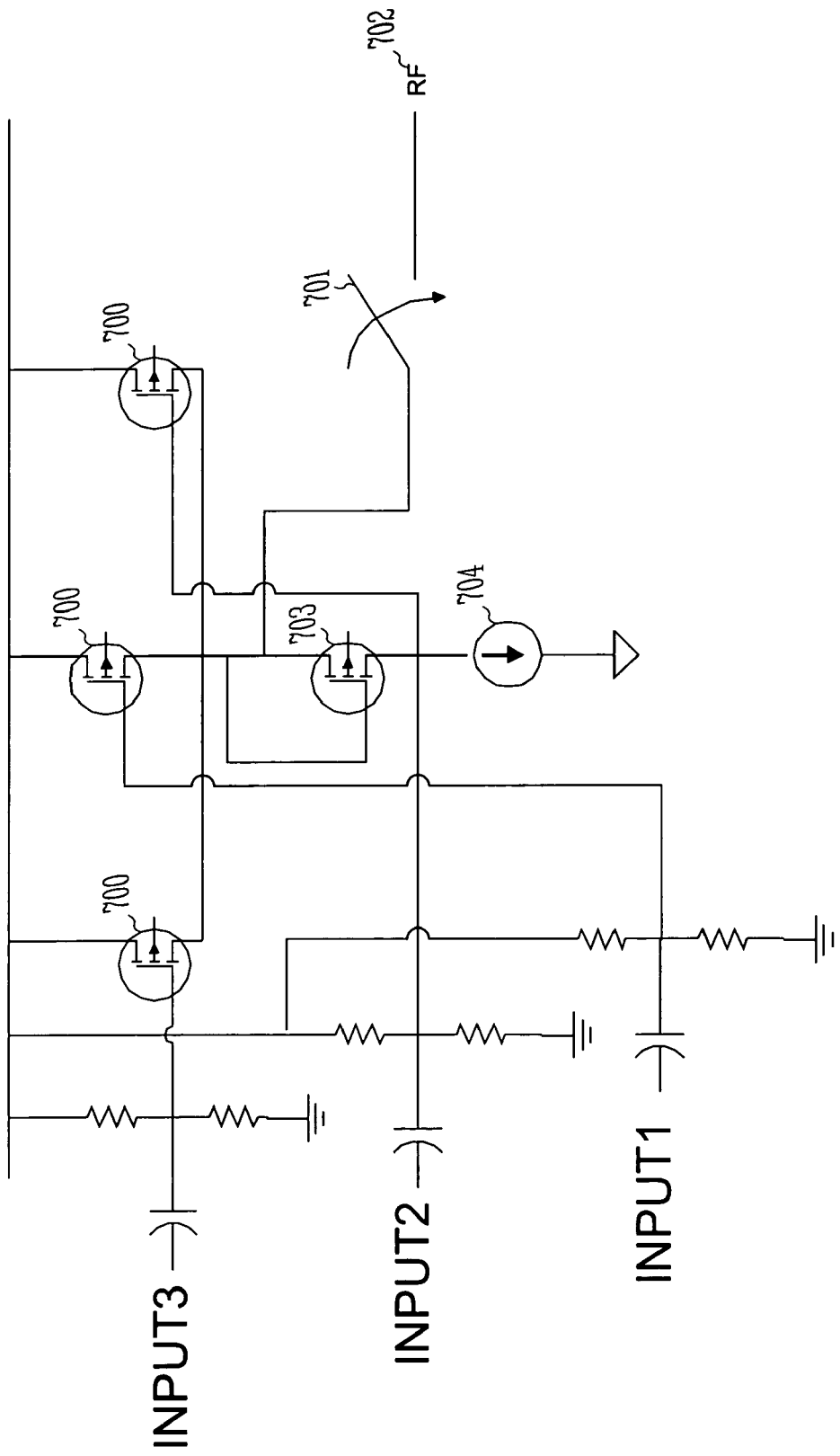
FIG. 7 shows a combination of fixed gm amplifiers with a CMOS RF switch, consistent with an embodiment of the present invention.

FIG. 7 shows another circuit implementing mixing and RF switching functions for production of ultrawideband pulses, employing a combination of fixed gm amplifiers. The circuit of FIG. 7 combines independent input carrier signals via input metal oxide semiconductor field effect transistors (MOSFET transistors) 700 biased in their constant current regions to produce a tail current proportional to the weighted sum of inputs. The physical dimensions of the input MOSFET devices determine the gain or weighting of each device's input signal as represented in the summed output, which is gated by RF output switch 701, and the size of the combining MOSFET 703 sets its gain. The combining transistor gain and the current drawn through current source 704 therefore determine the output signal level, in combination with the characteristics of the input MOSFETs. Each of inputs 1, 2, and 3 is either a carrier signal or a window function shaping signal component, and are combined and gated to produce RF output signal 702. The capacitors coupled to each input serve as direct current blocking filters, such that any direct current bias on the input signal does not affect the biasing of the transistors in the circuit of FIG. 7. Biasing each input transistor is handled by the resistor networks coupled to each input.

FIG. 8 is a circuit diagram illustrating construction of an RF switch as is used to gate the window-shaped carrier functions in FIGS. 4-7, and FIG. 9 illustrates one embodiment of construction of such a circuit. While a single FET or other device may be used as an RF switch in some embodiments, the circuit of FIG. 8 provides for gain, and better control of the output signal as is explained in greater detail below. The RF signal is input to the gate of p-type MOSFET M0, which is further coupled to a voltage source at transistor M0's source and to the gate of n-type MOSFET M2 and drain of n-type transistor M1 at transistor M0's drain. A gating signal 802 is coupled to the gate of transistor M1, and transistor M1's source is connected to the drain of transistor M2 and to an output terminal 803. Transistor M3's source is connected to a ground or reference potential. This CMOS RF switch is operable to control the time duration and therefore the spectral bandwidth of the output signal by controlling the width of the gating pulse input at 802, which allows current to flow from transistor M0 to M2.

Figure 9:
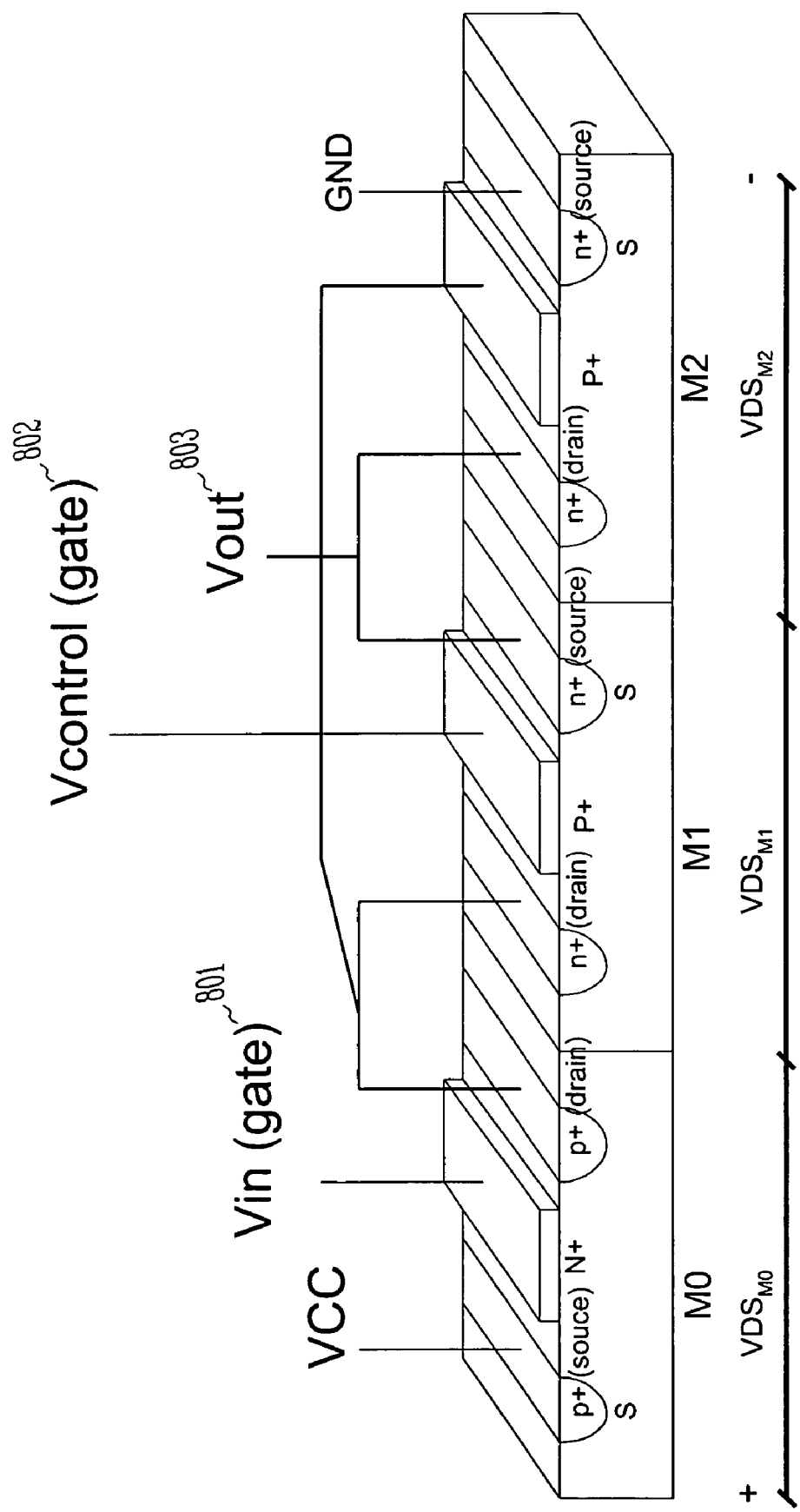
FIG. 9 shows one embodiment of construction of the circuit of FIG. 8 using CMOS, consistent with an embodiment of the present invention.

An implementation of the RF switch circuit of FIG. 8 is shown in cross-section form in FIG. 9, which serves as an example of how such a circuit may be efficiently implemented in integrated circuit form. The RF input signal 801 is coupled to the gate of p-type MOSFET M0, and the gating signal 802 is applied to the gate of n-type MOSFET M1. The gated output signal is provided from the coupled source of M1 and drain of n-type MOSFET M2. Power is applied by grounding the source of M2, while providing a power signal Vcc to the source of M0. The gate of M2 is further coupled to the drain of M1 and the drain of M0. In operation, the state of RF input signal 801 controls the state of output 803 when the gate signal 802 is at a logical high level, as all transistors operate in saturation mode. The duration, and therefore the bandwidth, of the output signal 803 is controlled by the gating signal 802. In a further embodiment of the invention, the gating signal 802 is a clock signal, and the duty cycle of the clock signal is employed to control the duration and bandwidth of the output signal 803.

Figure 10:
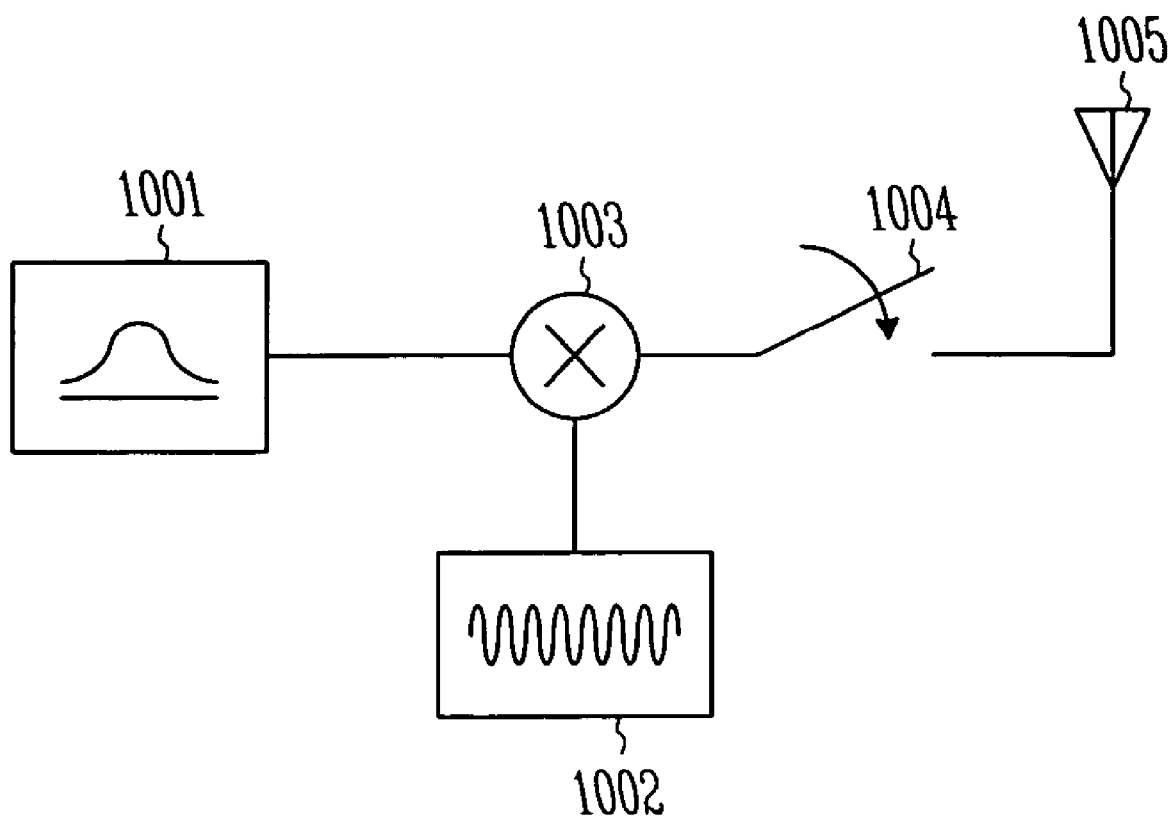
FIG. 10 illustrates an ultrawideband data communications system, consistent with an embodiment of the present invention

FIG. 10 illustrates an ultrawideband data communications system, consistent with an embodiment of the present invention. A first signal source 1001 produces a window signal, which in some embodiments is derived from one or more sinusoidal signals as shown and discussed in conjunction with FIG. 1. A carrier signal is produced by a second signal source such as second signal generator 1002, and is mixed with the window signal in mixer 1003 to produce a product signal such as that of FIGS. 2A and 2B. The output of the mixer is in some embodiments further gated by a radio frequency (RF) switch 1004 before coupling to an antenna 1005, while in other embodiments the RF switch is omitted and the output of the mixer is coupled to the antenna without an RF switch between. The antenna 1005 is operable to transmit or radiate a signal it receives and will take various forms in various embodiments of the invention, such as a Yagi antenna configured to operate over a relatively wide frequency range.

The output signal provided to antenna 1005 will be modulated with a data signal in further embodiments of the invention, such as via a mixer or switch coupled to receive the data signal and connected to one or more elements of the data communications system. For example, the data signal may be coupled to switch 1004, such that switch 1004 is used to modulate the output of mixer 1003 with the data signal. Other embodiments include modulation of the window signal produced at 1001, modulation of the carrier signal produced at 1002, or modulation of the mixer 1003. Modulation of any of these components can be implemented to result in modulation of the output signal sent to antenna 1005, and therefore modulate a signal radiated or transmitted from the antenna with the data signal.

These example embodiments of the present invention show how various circuit elements can be constructed and employed to produce ultrawideband signals. Application of various window functions such as the sinusoidal functions given as examples here to a carrier signal result in ultrawideband pulses of controllable frequency and spectral width, making the present invention suitable for generation of ultrawideband pulses for communications applications. The present invention seeks in various embodiments to apply analog window functions to an analog carrier signal to produce ultrawideband signals, as well as to produce of windowing functions using analog signals and processing as is demonstrated in these examples.

Specific embodiments have been illustrated and described herein, but it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. An ultrawideband radio frequency signal generator, comprising:
a first signal generator operable to generate a sinusoidal window function;
a second signal generator operable to generate a carrier signal;
a mixer operable to produce an ultrawideband radio frequency product signal as a product of the sinusoidal window function and the carrier signal; and
an RF switch operable to gate the ultrawideband radio frequency output signal;
wherein the RF switch comprises a P-FET, a first N-FET and a second N-FET;

the source of the P-FET coupled to the first voltage source, the gate of the P-FET coupled to the input voltage level, and the drain of the P-FET coupled to the drain of the first N-FET and the gate of the second N-FET;

the gate of the first N-FET coupled to receive the control signal, and the source of the first N-FET coupled to the drain of the second N-FET;

the source of the second N-FET coupled to the voltage reference.

2. An ultrawideband radio frequency signal generator, comprising:

a first signal generator operable to generate a sinusoidal window function;

a second signal generator operable to generate a carrier signal; and a mixer operable to produce an ultrawideband radio frequency product signal as a product of the sinusoidal window function and the carrier signal; and an RF switch operable to gate the ultrawideband radio frequency product signal, wherein the RF switch comprises at least three coupled CMOS transistors;

wherein the at least three coupled CMOS transistor are coupled to a first voltage source, a voltage reference of a different voltage than the first voltage source, an input voltage level, a control signal, and an output conductor; and wherein the at least three coupled CMOS transistors comprise a P-FET, a first N-FET and a second N-FET;

the source of the P-FET coupled to the first voltage source, the gate of the P-FET coupled to the input voltage level, and the drain of the P-FET coupled to the drain of the first N-FET and the gate of the second N-FET;

the gate of the first N-FET coupled to receive the control signal, and the source of the first N-FET coupled to the drain of the second N-FET;

the source of the second N-FET coupled to the voltage reference.

* * * * *

UNITED STATES PATENT AND TRADEMARK OFFICE
CERTIFICATE OF CORRECTION

PATENT NO. : 7,415,245 B2
APPLICATION NO. : 10/815171
DATED : August 19, 2008
INVENTOR(S) : Tinsley et al.

It is certified that error appears in the above-identified patent and that said Letters Patent is hereby corrected as shown below:

On the Title page, in field (56), under "Other Publications", in column 2, line 2, delete "Application" and insert -- Applications --, therefor.

Signed and Sealed this

Eleventh Day of November, 2008

JON W. DUDAS
*Director of the United States Patent and Trademark Office*